United States Patent [19]

Gargini

[11] 4,090,220
[45] May 16, 1978

[54] WIRED BROADCASTING SYSTEMS FOR PROCESSING CODED DATA REPRESENTATIVE OF SUBSCRIBER STATION CONDITIONS

[75] Inventor: Eric John Gargini, West Drayton, England

[73] Assignee: Communications Patents Limited, London, England

[21] Appl. No.: 725,338

[22] Filed: Sep. 21, 1976

Related U.S. Application Data

[63] Continuation-in-part of Ser. No. 487,190, Jul. 10, 1974, abandoned, which is a continuation of Ser. No. 307,613, Nov. 17, 1972, abandoned.

[51] Int. Cl.² ............................................. H04N 7/10
[52] U.S. Cl. ...................................... 358/86; 325/308; 325/31
[58] Field of Search .................. 325/308, 309, 31; 358/84, 86

[56] References Cited

U.S. PATENT DOCUMENTS

| | | | |
|---|---|---|---|
| 3,693,090 | 9/1972 | Gabriel | 325/308 |
| 3,803,491 | 4/1974 | Osborn | 325/308 |
| 3,944,742 | 3/1976 | Cunningham | 325/308 |
| 3,987,397 | 10/1976 | Belcher et al. | 325/308 |
| 3,997,718 | 12/1976 | Ricketts et al. | 325/308 |

*Primary Examiner*—Robert L. Griffin
*Assistant Examiner*—Jin F. Ng
*Attorney, Agent, or Firm*—Laurence R. Brown

[57] ABSTRACT

A wired broadcasting system in which subscribers are connected to a program exchange through their own individual pairs of twisted conductors. Each pair is associated with an intersticial pair of conductors for low frequency signals.

Central information processing equipment is provided functionally connected to the subscribers' stations to permit collection of data at the central processing station. Coded signal data is sent from the central processing station via the program exchange to the subscriber stations, local data is introduced into the coded signal data at the subscriber station, and the supplemented coded signal data is returned to the central processing station.

13 Claims, 10 Drawing Figures

WIRED BROADCASTING SYSTEMS FOR PROCESSING CODED DATA REPRESENTATIVE OF SUBSCRIBER STATION CONDITIONS

This application is a Continuation-in-Part of U.S. Ser. No. 487,190 filed July 10, 1974, now abandoned, which was a continuation of U.S. Ser. No. 307,613 filed Nov. 17, 1972, now abandoned.

The present invention relates to wired broadcasting systems by which a number of television or other programmes may be transmitted through a distribution network to a plurality of subscribers who are able to select desired programmes.

Various systems have been proposed to make a number of television transmissions available to subscribers, and a system which has been developed by the applicants which offers a number of advantages over alternative systems is described in U.S. Pat. No. 3,693,090 based on the use of programme exchanges serving a group of subscribers each of whom has his own individual vision circuit to the programme exchange, provided by a twisted pair of conductors with intersticial conductors associated with each pair for the transmission of signals for controlling switch means at the programme exchange whereby any of a number of programmes may be selected by the subscriber and applied to the twisted pair vision circuit for transmission to that subscriber. In general a number of such programme exchanges distributed over the network area receive a number of colour transmissions through a trunk network from a central programme station, commonly referred to as the transmitter.

Such a system is extremely versatile and may be used not only for the transmission of vision signals from the programme exchanges to the individual subscribers, but a wide range of other facilities can be provided. Thus for example information or instructions originating at the subscriber's premises can be transmitted through the programme exchanges to central equipment, and if required vision signals can be so transmitted. Systems of this kind could be used for simple selective signals to be passed from the subscriber to a central station, for example for alarm circuits or for remote reading of gas, electricity and water meters. Also signals may be transmitted to the subscriber for the control of heating, lighting and safety functions. Apart from these comparatively simple operations involving little more than signalling conditions, this equipment can also make use of the vision channels for subscription television, for assessing programme popularity, for subscriber polling purposes, and for computer assisted teaching and information retrieval systems, in which various signals have to be transmitted from the subscribers to a central station.

Certain of these additional facilities however require the transmission of more information than can easily be transmitted over the wired network by direct current signalling methods or by step-by-step switching methods, in which method signals are transmitted over the interstricial pair of conductors extending between each subscriber and the programme exchange to which he is connected.

Accordingly the present invention provides a wired broadcasting system in which each of a group of subscriber's stations is connected to a programme exchange through a signal path which comprises two pairs of conductors respectively for the transmission of high frequency television signals and lower frequency audio and control signals, controlling switch means coupled with the programme exchange and operable by control signals generated by a subscriber to make a programme selection and to apply to the subscriber's high frequency conductor pair any selected one of a number of programmes, means at said subscriber station for communicating control signals over said lower frequency conductor pair to operate said controlling switch means to select a desired one of said programmes at said programme exchange, a central data processing station for sending coded signal data to said programme exchange with the video signals of each of said programmes and coupled by said switch means through the higher frequency conductors to the subscriber station, whereby said coded data is sent to each subscriber station from said programme exchange over said higher frequency conductors along with vision signals of any selected one of said programmes, means located at subscriber's stations for modifying data received from said central data processing station with local data and returning said modified data over said high frequency conductors to said programme exchange at a frequency different from that at which data is received at said subscriber station, and means for returning to the central processing station from each subscriber station through further switch means at least a portion of said modified data.

The transmission of information between the subscriber's station and a central processing station is effected by the repeated transmission of a train of pulsed binary signals utilising frequency shift 0/1 signals transmitted over the vision network in a frequency band selected so that interference with the vision circuits is avoided or can be eliminated by suitable circuit devices.

The central processing station is arranged to transmit binary frequency shift signals into the vision trunk circuits at the nearest convenient point so that the signals transmitted by the central station reach every subscriber via the selection switch provided at the subscriber's terminal station, these signals in effect interrogating the subscriber's stations in every position of the subscriber's selector switches even with a particular selector switch in the off position in which no vision signal has been selected and the television equipment is out of use.

In order that the invention may be more readily understood, one embodiment thereof will now be described, by way of example only, with reference to the accompanying drawings in which.

Figure 1:
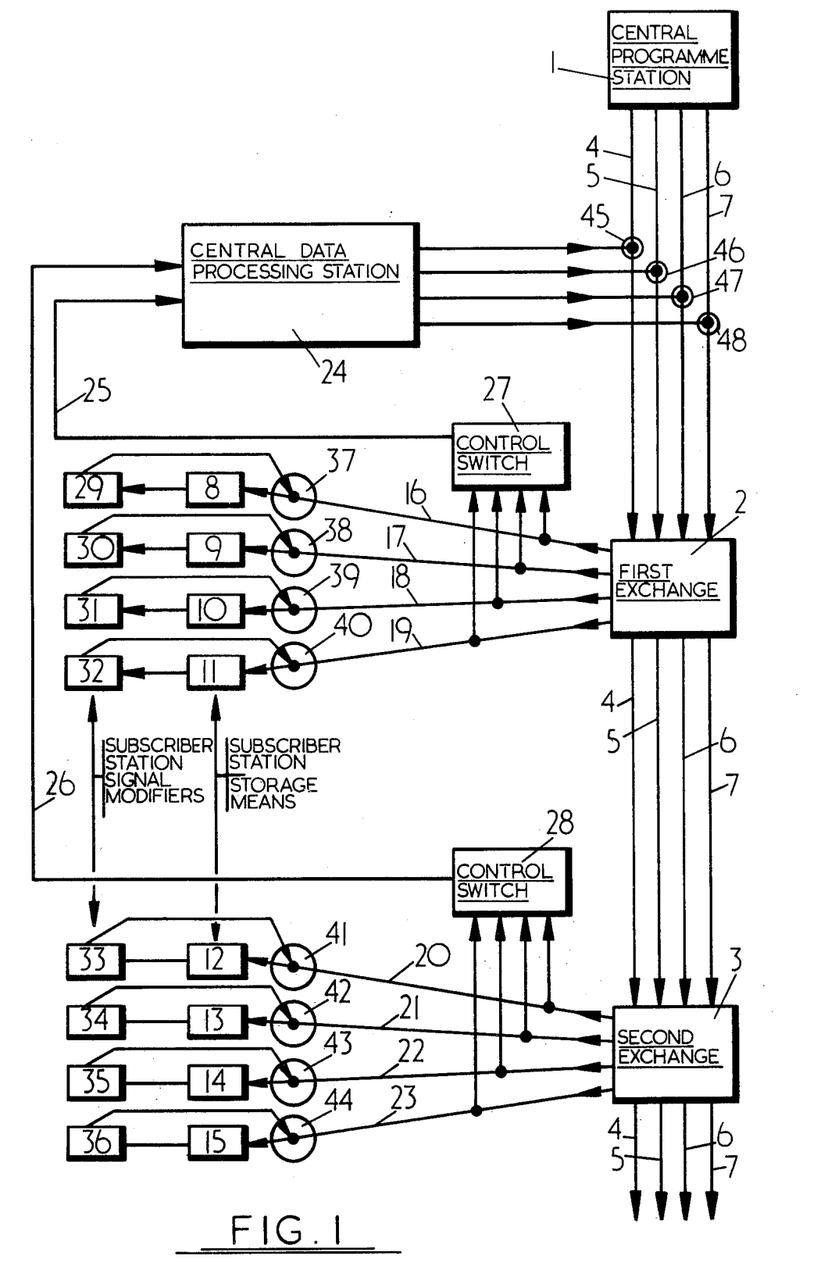
FIG. 1 is a block schematic diagram of a wired broadcasting system in accordance with the present invention.

Referring to FIG. 1, the wired broadcasting system shown comprises a central programme station 1 connected to programme exchanges, two of which are shown at 2 and 3 respectively, by means of a trunk network which may typically comprise a plurality of co-axial cables four of which are shown at 4,5,6 and 7 although in a practical system many more, for example thirty five would be used. Each cable of the trunk network is arranged to convey one television programme between the central station 1 and each of the programme exchanges 2,3.

At each programme exchange a plurality of programme selection switches are provided. Each selection switch is connected to a respective one of a plurality of subscriber stations 8–15 by means of a respective one of a plurality of cables 16–23. Each of cables 16–23 has a twisted pair of conductors suitable for the transmission of high frequency television signals having associated therewith an intersticial pair of conductors suitable for the transmission of audio frequency and control signals.

The subscribers programme selection switches may be controlled by the subscribers to derive signals from any one of the trunk cables and are arranged to be connected to derive signals from one of the trunk cables whether or not the corresponding subscriber station is operative. Accordingly, signals injected into every one of the trunk cables will reach every subscriber station irrespective of the state of the subscriber station. A central data processing station 24 is arranged to inject information or data signals into the trunk network at any convenient point. As shown in the drawing this is, in this example, between the central station 1 and the first programme exchange 2. These information or data signals will be transmitted through the network to every subscriber irrespective of the state of his terminal equipment. The information or data signals comprise frequency shift binary representative pulse signals and after reception by the subscriber are returned in modified form to the data station 24 over separate cables 25,26 extending between the programme exchanges 2, 3 and said data station 24. Conveniently, the information or data returned by the subscribers equipment to the data station 24 has a frequency double that of the interrogating signal and modifies or adds thereto various characters as determined by the subscribers equipment and/or by the programme exchanges.

The cables 24,26 linking each programme exchange 2,3 to the data station 24 are 12-pair cables each pair of which is used on a time division multiplex basis sequentially to transmit the signals from the subscribers of a group of say 28 subscribers connected to the programme exchange, assuming the case of a programme exchange intended to serve 336 subscribers in all.

At the programme exchanges 2,3, each pair of the 12-pair cables 25,26, is connected to the rotor connection of a continuously driven stepping switch shown diagramatically at 27,28, the stationary contacts of which are each connected to the control pair of a corresponding one of the 28 subscribers. The continuously driven switches 27,28, may have a number of unused positions, for example, eight positions in the case of a 36-way switch used with 28 subscribers, and these eight positions are adapted by connecting some of the stationary contacts to suitable potential sources to transmit a code signal into the respective pair of the 12-pair cable to identify at the central processing station 24 the particular group of 28 subscribers associated with that switch.

Thus the central processing station 24 interrogates all the subscribers over the vision channels at a very high rate and the signal received by each subscriber is stored together with any desired information from the subscriber, ready for transmission to the central processing station at that time when a transmission path extends back to it from that subscriber's station. The information or data signal fed into the trunk cable of each different vision programme differs in respect of the initial part of the message to define the programme channel. It will be appreciated that the information or data returned to the central processing station through the pairs of the 12-pair cable will thus identify the programme to which the subscriber is connected at the particular instant concerned, and additional information inserted by the subscriber's equipment will identify the particular subscriber, enabling computer-like systems at the central processing station to perform any required operation, for example, billing or programme popularity determination.

Even if the subscriber's equipment is switched off the equipment will still be switched to derive signals from one of the trunk cables so that an appropriate response continues to be received from the subscriber's equipment. The selector switches 27, 28, at the programme exchanges may be connected to each subscriber for say 250mS every few seconds, say up to 20 or 30 secs. and during this connection the central processing station is able to receive the return message set up by the immediately preceding interrogation of the subscriber over the trunk cable to which his equipment is switched. The subscriber's equipment includes means 29–36 for responding to and modifying the information or data signals. This equipment includes means to serve as a buffer store, for example, a magnetic core or solid state logic store or, in a simple arrangement, a switch or knob set by the subscriber in response to voting or opinion seeking or forming part of an instructional system.

A plurality of directional couplers 37–44 are provided for returning the signals from the subscribers responding equipment 29–36, and low pass HF filters 45–48 are provided to combine the outputs of the central data processing station with the TV signals on cables 4–7.

The frequency shift signals used may be as follows:

0 = 110KHz
1 = 140Hz

This frequency shift signal is doubled in frequency at the subscriber's station and it is these frequency shift signals which are returned on a time multiplex basis to the central processing station through the selector switches 27,28, at the programme exchanges and through the 12-pair cables 25,26. It will of course be understood that 12-pair connecting cables 25,26, may be replaced by a carrier wave system with say 12 carrier frequencies spaced by nominal 80KHz intervals carried by a single, common cable.

The message transmitted from the central processing station may comprise the following groups of signals or "words":

A = 3 bits, which is the master reset signal for subscriber located memory stores and may include a timing function for synchronising remote signalling oscillators.

B = 10 bits, including a parity bit, which labels the vision channel, e.g. 0 to 35 and also provides information on the type of television programme, e.g.

free, educational, or fee-paying, and may also provide pricing information.

C = 16 bits, (including parity) which is specifically allocated to subscribers' addresses and also provides means for addressing students' "frame snatch" equipment in connection with teaching and library application, to permit a stationary picture to be held for study, or to permit a student to reply by selective switch operation.

D = 10 bits; this carries the basic instruction from the processing equipment to subscriber's local stores and condition the subscriber's equipment to deal with the specific function, i.e. any of the various services for which the equipment is designed.

E = 16 bits with parity; this is a data shift signal which empties or samples the subscriber's buffer store, which may be a core or solid state logic store, or may be a button set by subscriber in response to voting or opinion-seeking or teaching vision picture or sound messages.

The complete five word 55-bit message is accepted continuously by all subscribers' equipment but returned to the central processing station from each subscriber in 250mS dwell times repeated say every 30 secs. The minimum bit rate for at least two messages (one repeat) is therefore:

110/250 mS = 440 bauds for any subscriber's output signal.

The minimum bit rate for signal processing equipment to sample say 30,000 subscribers for urgent functions with a 30 second recurring cycle is:

(55 30,000)/30 = 55,000 bauds

The central processing station 24 will produce and transmit a message sequence for each vision channel available. All messages at any moment will only differ in word B information (programme or channel labelling), i.e. words A and C to E will be common.

All returned signals to the central processing station pass through the selector switch 27,28, at the programme exchange and the multi-circuit cables 25,26.

The message sequence received at a particular subscriber will be modified in two ways before return to the central processing station via the programme exchange.

1. The carrier frequency is doubled,
2. The message format is modified by the information and instructions added by the subscriber or subscribers' equipment.

A typical message format will include the following words:
A. As transmitted.
B. A signal indicating that the subscriber's receiver is in use.
C. First 8 bits blank (awaiting labelling at exchange for selector identification) and the second 8 bits carry the information derived from the use of the subscriber's equipment.
D. As transmitted.
E. The data called up by D from the subscriber's store.

An overriding alarm facility to warn of damage to the cable in burglary or fire may be provided. This alarm operates automatically when a test programme fails to obtain any information from a particular subscriber when other subscribers in the same group of 28 subscribers are returning signals normally.

Having described the structure and operation of the system of FIG. 1 in general terms, components of that system will now be described in detail.

Figure 2:
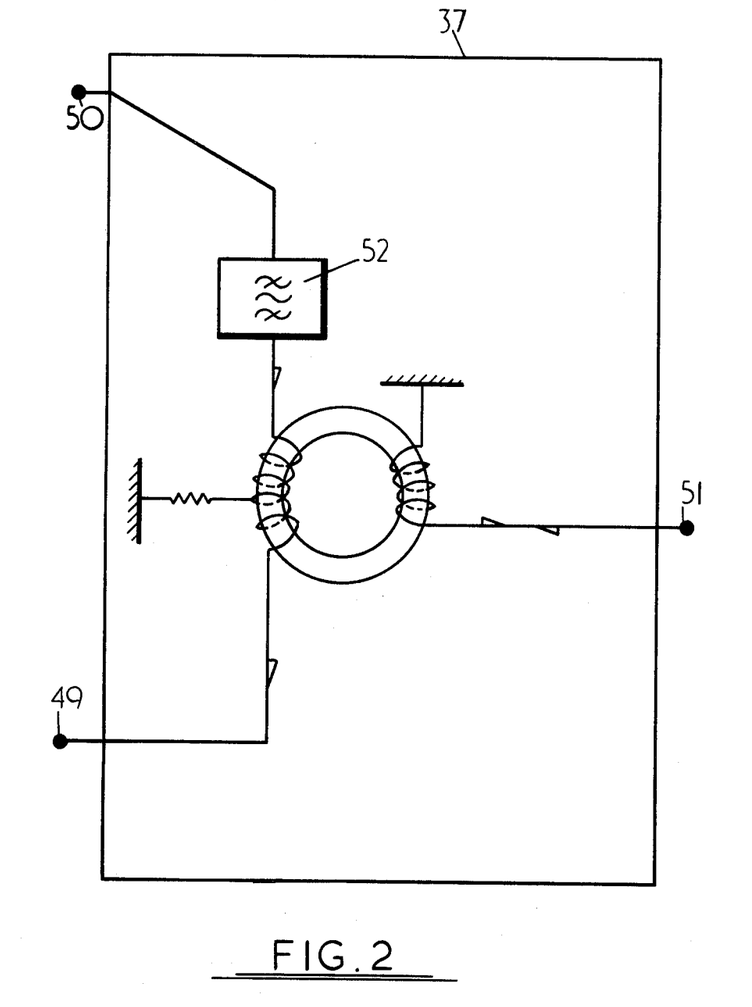
FIG. 2 is a schematic diagram, partly in block form of the directional coupler embodied in the invention.

Referring to FIG. 2, the directional coupler 37 is illustrated and comprises terminals 49, 50 and 51 connected respectively to subscriber station 8, signal modifier 29, and cable 16. Data signals pass in each direction through terminal 51, received data signals passing to the subscriber station through terminal 49 and returning after modification through terminal 50. A band pass/filter 52 having a pass band of 220 to 280 KHz is located between the coupler and terminal 50 to prevent incoming data signals at 110–140 kHz and television signals in the band 3–10 MHz from "seeing" the output impedance of the equipment signal modifier 29. This prevents unnecessary attenuation and provides isolation between the go and return frequency shift signals.

Figure 3:
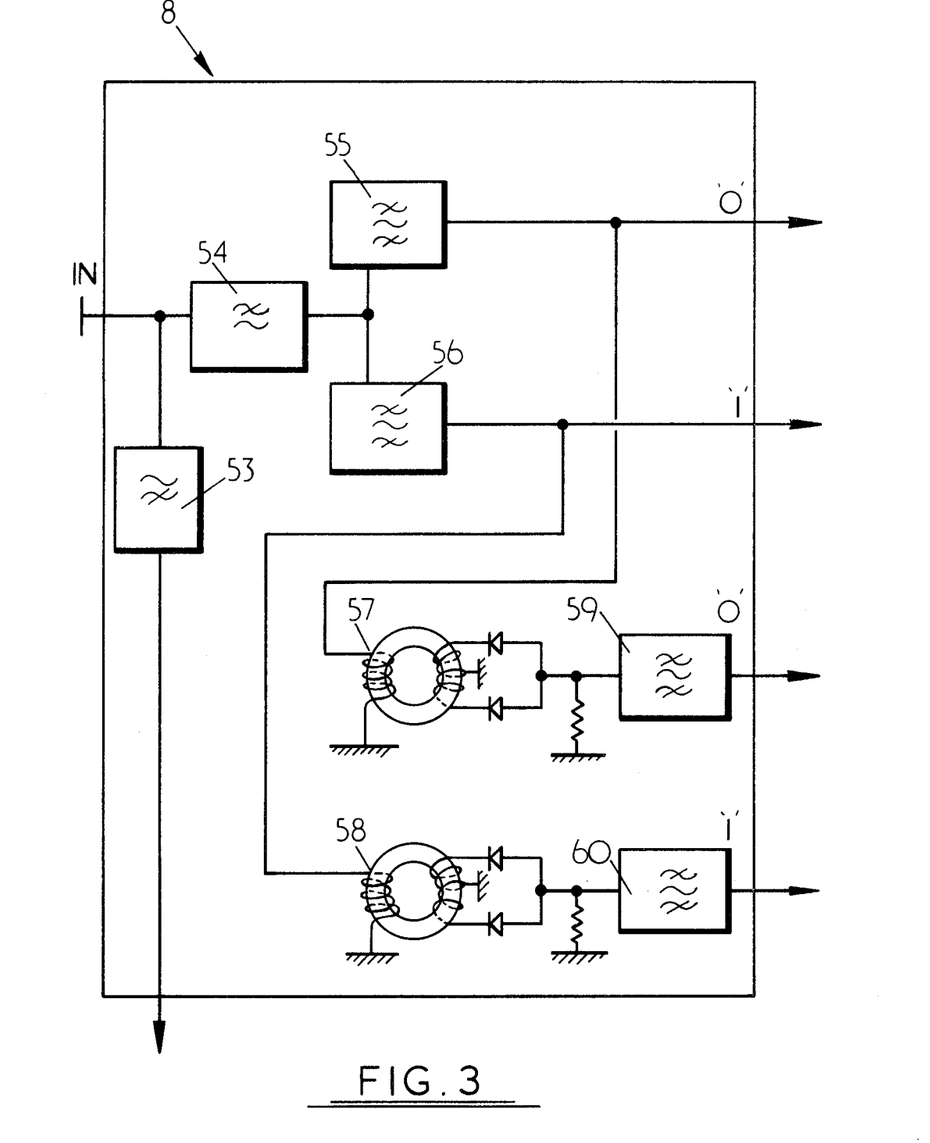
FIG. 3 shows schematically, partially by block diagrams, subscriber station circuitry for deriving binary coded signals.
Figure 4:
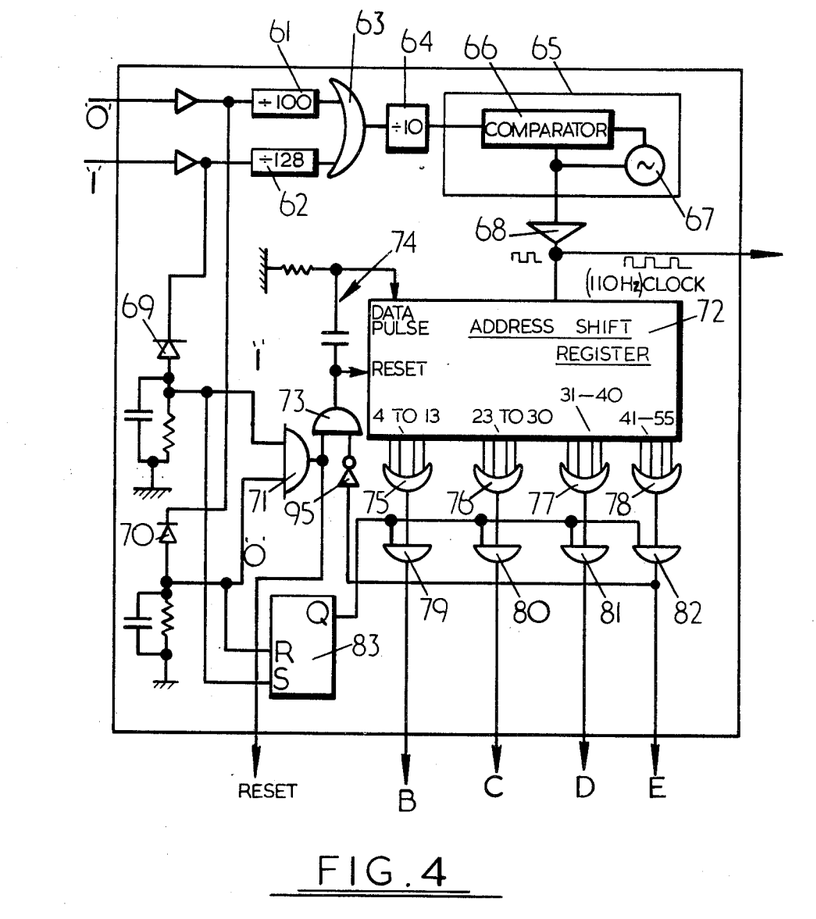
FIGS. 4, 5 and 6 shows in block schematic diagram, circuits at the subscriber station for processing and modifying coded signals.
Figure 5:
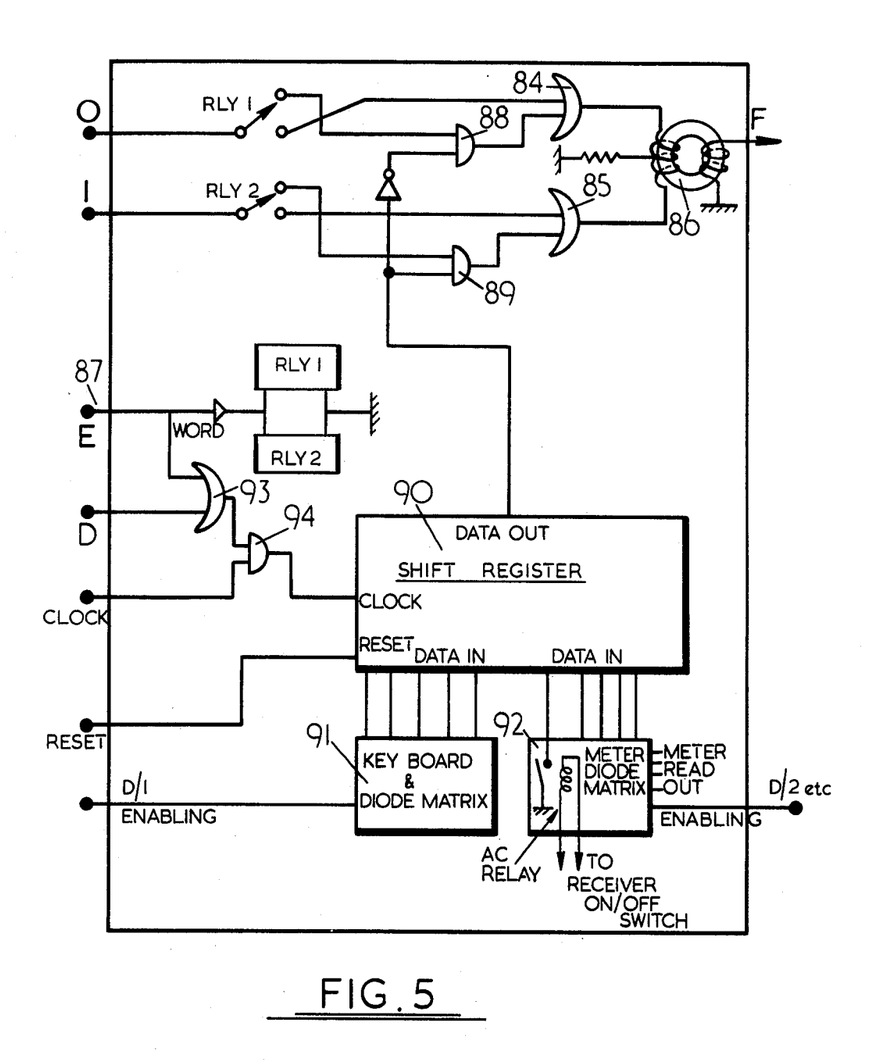
Figure 6:
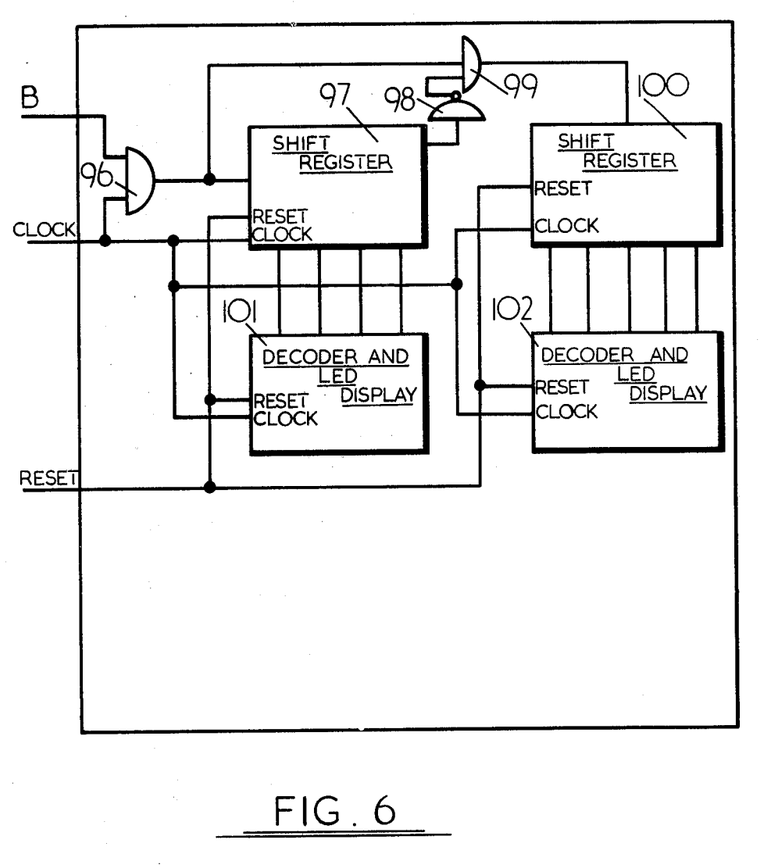

Referring now to FIGS. 3 and 4, the detailed arrangement of the subscriber station 8 will be described. Incoming signals from directional coupler 37 are separated by a high pass filter 53 passing the television signals in the band 3–10 MHz and a low pass filter 54 passing the data signals at 110–140 kHz. The '0' data signals at 110 kHz and the '1' data signals at 140 are applied to band pass filters 55 and 56 respectively. The separated signals at 110 and 140 kHz are applied to simple frequency doublers 57, 58 respectively which operate in the same way as a bi-phase power rectifier to provide second harmonic return signals at 220 and 280 kHz respectively. Band pass filters 59, 60 are provided for these return signals in order to give them satisfactory spectral purity. The outputs of filters 53, 59, 60 are applied to the subscribers signal modifier 29 (FIGS. 4, 5 and 6). The separated data signals at carrier frequency provided at the outputs of filter 55, 56 are amplified and then applied to frequency dividers 61, 62 to provide inputs to an OR gate 63, the output of which is applied a further divider 64 as a 110 Hz controlling signal to a phase locked oscillator 65 comprising a comparator 66 and oscillation source 67. The output of the oscillator 65 is passed through a limiter 68 and the limited signal is employed as a clock.

The amplified data signals which are applied to dividers 61 and 62 are also rectified by diodes 69, 70 and applied through an AND gate 71 to the reset input of an address shift register 72. A further gate 73 is arranged in the reset input circuit to prevent false resetting during the transmission of bits 41–55 of the data. The data word A, which is the master reset and sync signal, consists of the simultaneous transmission of three noughts and three ones which therefore cause an output to appear at the reset terminal of the address shift register 72. The data pulse which is shifted through this register is generated from the reset pulse through a differentiator network 74 and applied to the data pulse input.

The word outputs from the shift register comprise bits 4–13 for word B, bits 23–30 for the second half of word C, the first half being generated at the exchanges 2 and 3 as will be explained later, bits 31–40 for word D and bits 41–55 for word E. The corresponding output terminals of the shift register are applied to OR gates 75–78 the outputs of which are applied as one input to respective subsequent AND gates 79–82. The other inputs of AND gates 79–82 receive generated data from terminal Q of a flip flop 83 which receives the rectified input data signals from diodes 69,70 at its input terminals R and S.

Details of the subscribers data responding and modifying equipment 29 are shown in FIGS. 5 to 8. The frequency doubled data signals provided at the outputs of filters 59, 60 (FIG. 3) are applied to relay contacts RLY 1 and 2 (FIG. 5) and are normally returned via OR gates 84, 85 and balun 86 to the directional coupler 37 (FIG. 2) and thence to the central data processing station. Throughout the duration of the word E the relay contacts RLY 1 and RLY 2 are actuated as a result of energisation of the relay coils RLY 1 and RLY 2 respectively by the rectified E word signal. The E word signal is applied to the relay coils via terminal 87 from the output of gate 82 (FIG. 4). When the relay coils RLY 1 and RLY 2 are actuated, the returning data is directed to a pair of controlling AND gates 88, 89 the other inputs of which are controlled by a shift register arranged to receive subscriber generated data by way of a keyboard and associated diode matrix 91 and non subscriber controlled data by way of a further diode matrix and television receiver on/off indicating relay 92. The shift register 90 receives clock pulses from the output of limiter 68 (FIG. 4) under the control of the D and E words applied to an OR gate 93 the output of which controls an AND gate 94 through which the clock signals are applied to the appropriate terminal of the shift register 90. The shift register 90 is also arranged to be reset by the reset pulse generated at the output of gate 71 (FIG. 4). It should be noted that as the E word comprises a simultaneous transmission of 0 and 1 data, parts of which are removed by the shift register controlled gates of FIG. 5 to provide the return data signal, the reset gate of FIG. 4 could see this simultaneous transmission as a start signal and thus reset the shift register 72 of FIG. 4. In order to prevent this false operation the E word is applied through an inverter 95 to the AND gate 73 arranged in the path of the resetting signal for the shift register 72.

As is apparent the shift register 90 of FIG. 5 is arranged to clock data both by the D word and the E word. The D word clocks out data generated automatically by auxiliary equipment at the subscribers premises whilst the E word enables data from the subscribers keyboard to be clocked out.

FIG. 6 shows the programme label display. This receives the B word from gate 79 (FIG. 4). Part of the B word is passed via AND gate 96 which also receives clock pulses into a first shift register, 97, which when full, enables, by means of an inverter 98 and an AND gate 99, a second shift register 100 to receive the remaining part of the B word. The data in the shift registers 97 and 100 is applied as B C D data to corresponding decoder and LED display modules 101 and 102 respectively. The module 101 associated with the first shift register 97 is arranged to display numerals so as to be capable of indicating the channel number of the programme being received, whilst the display module 102 associated with the second shift register 100 is arranged to display letter characters to indicate the class of programme, for example general off-air, pay television and cost class and educational. The register 97 and 100 and modules 101 and 102 are reset by the reset output from gate 71 (FIG. 4).

Figure 7:
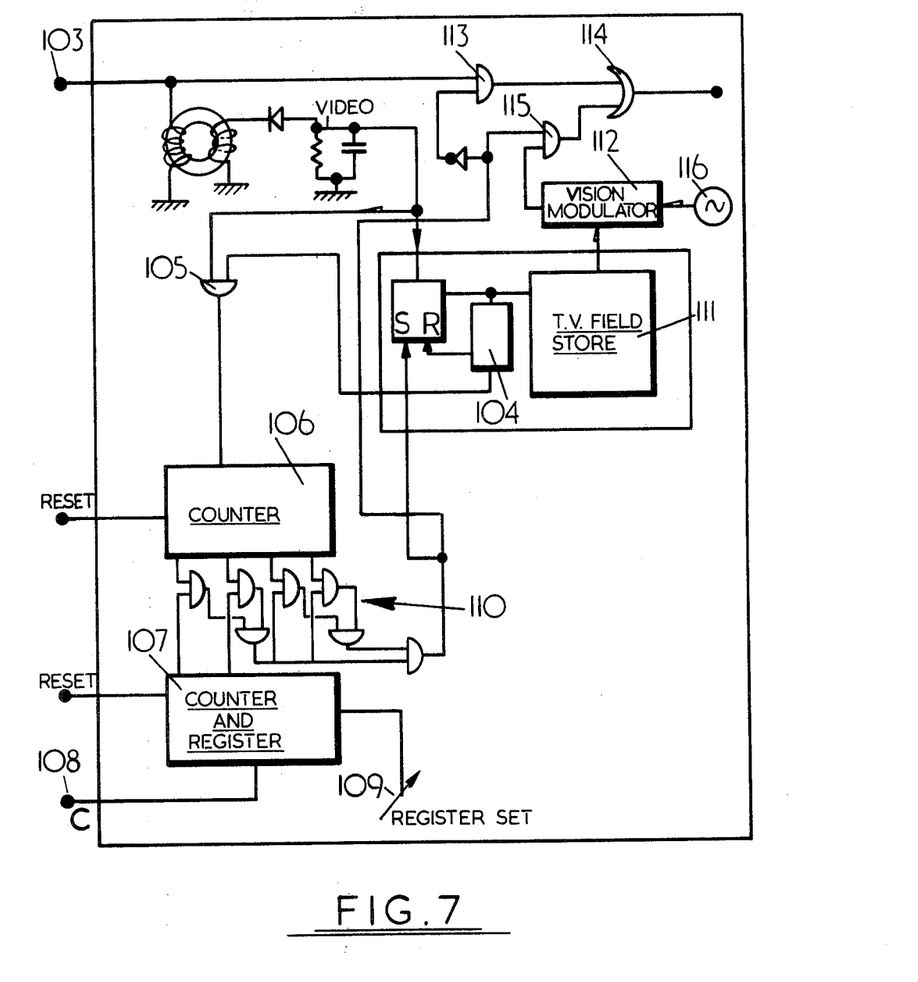
FIG. 7 shows in block schematic diagram a frame snatcher arrangement for the subscriber station.

FIG. 7 shows a frame snatcher arrangement. In this the HF television signal is received at terminal 103 from filter 53 (FIG. 3) detected, and applied to a synchronising separator and television line counter 104 and a field number identifying gate 105. The field identifying numnber is applied to a counter 106 which is associated with a counter and register 107 arranged to receive the second half of the C word at terminal 108 from gate 80 (FIG. 4). Alternatively 107 may be set by a manual register set control 109 set to correspond with the number of the frame it is desired to snatch. The counter 106 and counter and register 107 have their outputs connected to a series of gates 110 so as to provide an output signal when the received frame corresponds with that directed to the student by a computer instructional programme or which corresponds with that chosen by the subscribers by operation of 109 to provide an enabling signal by means of which that frame of the television picture is snatched and placed in a television field store 111. This is a well known arrangement which can provide a repetitive output to a vision modulator 112 a signal from which modulator can replace the incoming television programme under the control of HF gates 113, 114 and 115. The modulator 112 receives the output of an oscillator 116.

Figure 8:
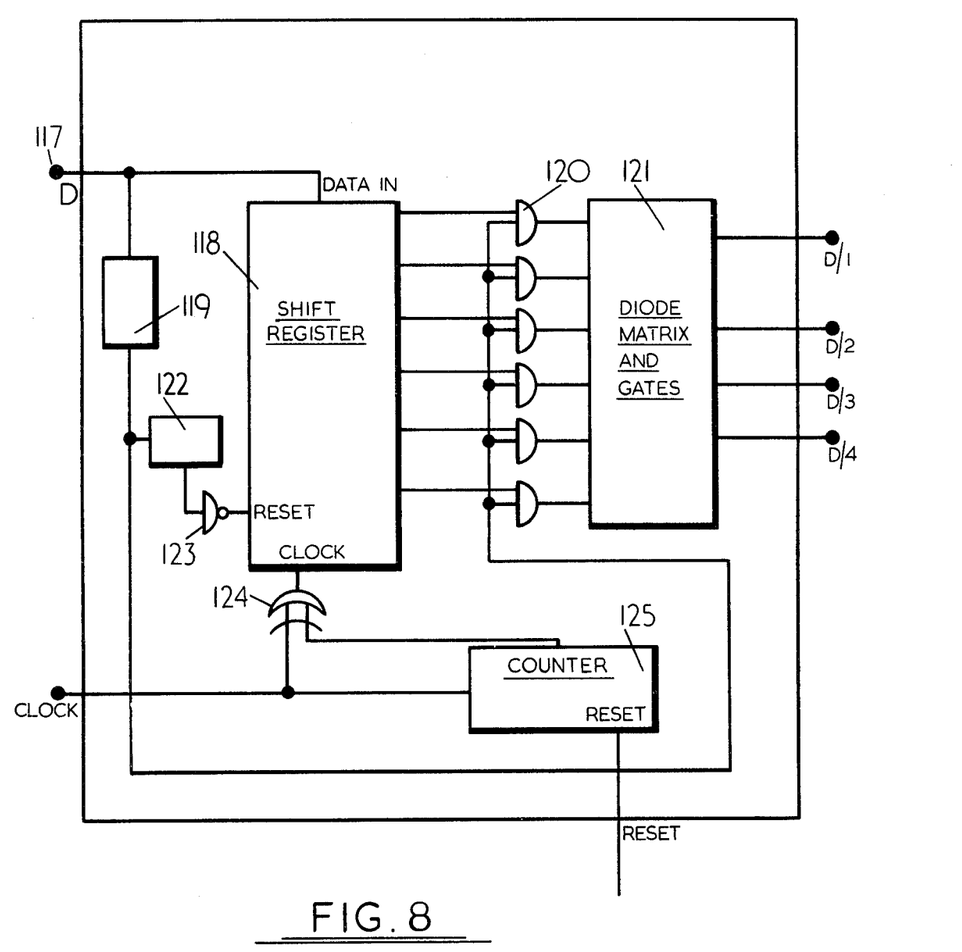
FIG. 8 shows in block diagram form coded signal processing and storage circuits at the subscriber station.

FIG. 8 shows an enabling system by means of which the various data stores at the subscribers' premises can be conditioned as and when required to return their output signals to the central data processing station. This arrangement takes the D word from gate 81 (FIG. 4) at terminal 117 and passes the D word data to its own shift register 118. In order that the shift register 118 may be fully loaded before the enabling signals are generated, a signal detector and delay arrangement including single shot monostable 119 is provided from the D word input to one input of each of a series of gates 120 arranged of the signal lines of the shift register and a diode matrix 121. Thus only when the shift register 118 is completely full are its output lines connected to the matrix 121. This matrix 121 may be hard wired with the subscribers address and in respect of the various auxiliary functions which any particular subscriber may wish to use. The shift register 118 is cleared by a second single shot monostable 122 the output of which is applied to the register reset terminal through an inverter 123. The clocking of the shift register 118 is arranged to occur only at the desired times by applying the clock signal thereto through a NOR gate 124 which has associated therewith a pulse counter 125 which itself is cleared by the overall resetting pulse generated at the output of gate 71 (FIG. 4).

The outputs of the diode matrix 121, i.e. D1, D2, etc, are enabling signal inputs for the various subscribers input functions of FIG. 5.

Figure 9:
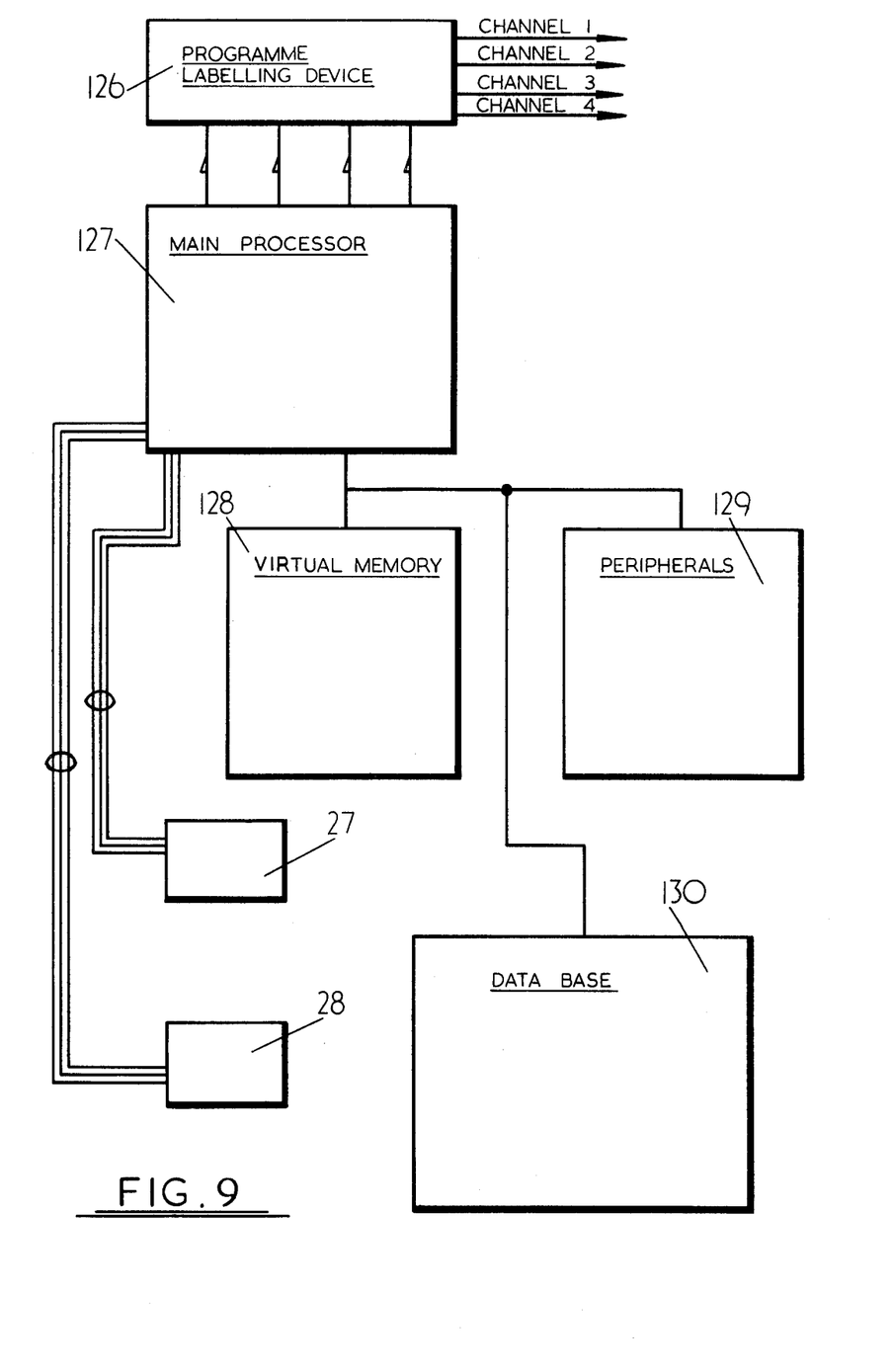
FIG. 9 is a block diagram of the central data processing station.

FIG. 9 is a block diagram of the central data processing station. A programme labelling device 126 operates to label channels by the same technique as the subscriber generates his return data during E word (FIG. 5) except that at the data station the keyed signals are locally generated waves at 110-140 kHz. The programme labelling of each channel made available is controlled by a main processor 127 such as a DATA GENERAL SUPER NOVA mini computer having a 32,000 word core store including multiprogramme protection. This together with its associated equipment is standard computing apparatus. The main processor receives the group of sequential data from the switches 27, 28 and is linked to a Virtual Memory 128, for example a high speed fixed head per truck disc memory such as the PPL Series 100 Disc Memory marketed by Process Peripherals Limited, to peripherals 129 such as card readers, magnetic tapes, line printers and CRT terminal display and to a Data Base 130 formed for example by IBM compatible removable media movable head disc memory having for example 50m bit characters. All this apparatus is available from current production and can be connected together in a manner well understood by those familiar with computing techniques and hence no details are described herein.

Figure 10:
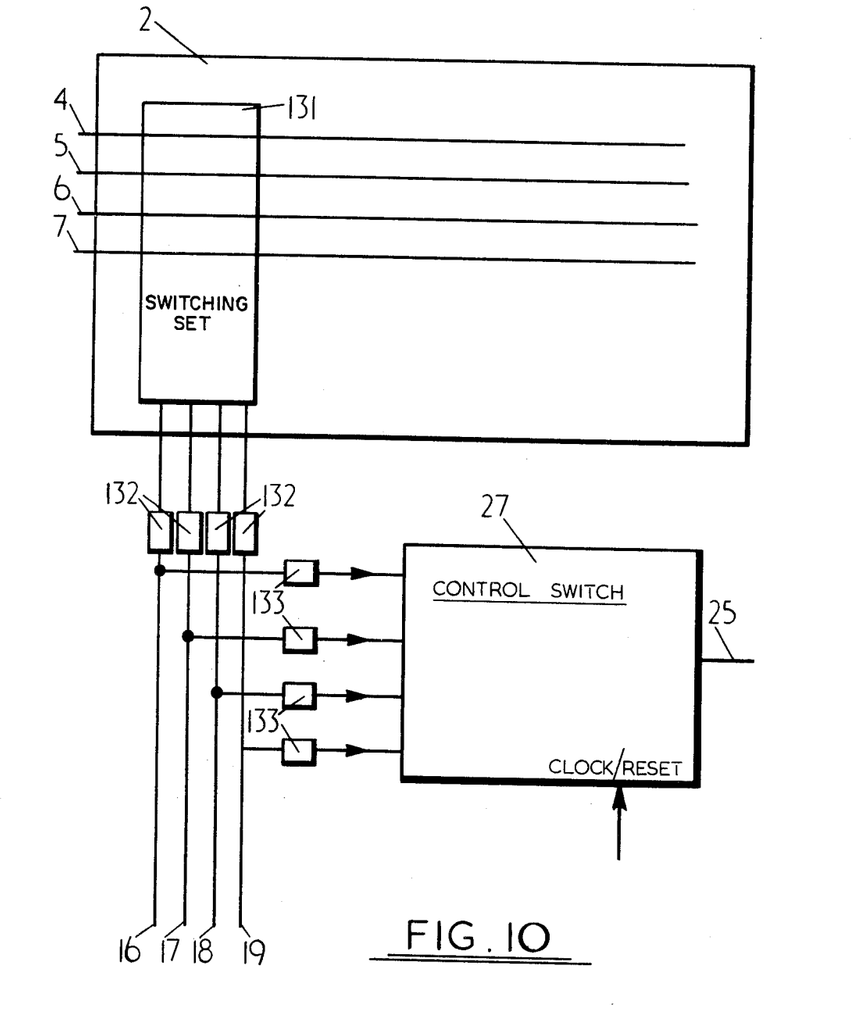
FIG. 10 is a block circuit diagram of programme exchange circuit connections.

Referring to FIG. 10, the exchange 2 comprises one set of selector switches 131, the set comprising four separate switches each capable of connecting to respective subscriber cable 16, 17, 18 or 19 to any one of the four channels 4, 5, 6, 7. Only four channels and four subscribers are shown to simplify the description. In a practical installation, twelve sets of selector switches would be provided per exchange, each set comprising 28 separate switches serving 28 subscribers and each switch enabling connection of its respective subscriber to any one of 36 channels.

When a subscriber wishes to view a programme on a particular channel, he applies control signals to his selector switch in the set of switches 131 in the manner described in U.S. Pat. No. 3,693,090 so that the switch moves to the selected channel. The selected HF television signal and the data signals which are applied to every channel are passed to the subscribers cable 16, 17, 18 or 19 via a 110–140 KHz band pass filter 132. Modified data signals returned to the exchange from the subscriber station are passed via a 220–280 KHz band pass filter 133 to the control switch 27 (FIG. 1).

The control switch 27 comprises a simple data signal generator which operates in the same way as the subscribers' equipment during E word. This data signal generator is caused to operate during the first half of the C word so as to label the signals returned from each subscriber receiving signals from that exchange with a code indicative of that particular exchange. This will indicate to the central data processing equipment the general location of the subscriber, the signals pertaining to any particular subscriber being resolved by the serial position of his message in the data returned from the control switch 27 to the data station. Each control switch 27 may comprise a motor driven reed switch of the same kind as is employed by the subscriber at the programme exchange for programme selection. The control switch also includes a store to convert the subscriber messages to a sequential stream which can be sent at high speed back to the central data processing station.

It should also be noted that the outgoing data signals from the central data processing station 24 are coupled to the signal lines 4 to 7 by means of band pass filters of the kind employed at the programme exchange 2.

What is claimed is:

1. A wired broadcasting system in which each of a group of subscriber's stations is connected to a programme exchange through a signal path which comprises two pairs of conductors respectively for the transmission of high frequency television signals and lower frequency audio and control signals, controlling switch means at the programme exchange and operable by control signals generated by a subscriber to make a progamme selection and to apply to the subscriber's high frequency conductor pair any selected one of a number of programmes, means at said subscriber station for communicating control signals over said lower frequency conductor pair to operate said controlling switch means to select a desired one of said programmes at said programme exchange, a central data processing station for sending coded signal data to said programme exchange with the video signals of each of said programmes and coupled by said controlling switch means through the higher frequency conductors to the subscriber station, whereby said coded data is sent to each subscriber station from said programme exchange over said higher frequency conductors along with vision signals of any selected one of said programmes, and means located at subscriber's stations for modifying data received from said central data processing station with local data and returning through further control switch means said modified data over said high frequency conductors to said central data processing station at a frequency different from that at which data is received at said subscriber station.

2. A wired broadcasting system as claimed in claim 1, including separate signal path means for returning said modified data to the central processing station from said further switch means.

3. A wired broadcasting system as claimed in claim 2, in which said further switch means comprises a control switch connected to the high frequency conductor pairs of a plurality of subscribers by band pass filters, the control switch applying the modified data appearing on the high frequency conductor pairs to said separate signal path means in sequence.

4. A wired broadcasting system as claimed in claim 1, including means at the subscriber stations for doubling the frequency of the data signals received from the programme exchange prior to their return, modified by local data, to the central data processing station.

5. A wired broadcasting system as claimed in claim 1, in which each subscriber station comprises a first shift register, means for rectifying the data signals received from the programme exchange, means for applying the rectified data signals to the first shift register, and a clock pulse generator for clocking the rectified data signals through the first shift register.

6. A wired broadcasting system as claimed in claim 5, in which the clock pulse generator comprises a phase locked oscillator and divider circuits applying a controlling signal to said phase locked oscillator, said divider circuits operating on the received data signals to provide said controlling signal.

7. A wired broadcasting system according to claim 5, comprising a second shift register, receiving outputs from the first shift register, means for providing inputs to said second shift register representative of said local data, and gate means for modifying said received data in response to the output of said second shift register.

8. A wired broadcasting system according to claim 7, wherein said input providing means comprise diode matrices and means for indicating the subscribers station is in use.

9. A wired broadcasting system according to claim 7, comprising a programme labelling display at each subscriber station having third and fourth shift registers interconnected so the fourth shift register is unoperative until the third shift register has received a predetermined number of bits of data, and LED displays connected to the third and fourth shift registers whereby the shift registers can receive a first part of an output of the first shift register and pass a second part of said output of the first shift register to the fourth shift register, the first part of said output of the first shift register representing the selected programme channel and the second part the class of programme on that channel.

10. A wired broadcasting system according to claim 9, comprising a fifth shift register receiving an output of the first shift register, the fifth shift register controlling a diode matrix and gates hard wired with the respective subscribers address.

11. A wired broadcasting system according to claim 1, comprising a frame snatcher in at least one of the subscriber stations.

12. A wired broadcasting system according to claim 1, comprising means at the central data processing station for transmitting said coded signal data over all programme channels to said programme exchange, each programme channel being provided with its own identification code to supplement the coded signals applied to all the programme channels.

13. A wired broadcasting system according to claim 1, in which each subscriber station is provided with means responsive to said coded data signal when said subscriber station is not operative.

* * * * *